United States Patent

Aoki

[11] 4,237,394
[45] Dec. 2, 1980

[54] FREQUENCY GENERATOR AND MINIATURE MOTOR PROVIDED WITH THE SAME

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 907,609

[22] Filed: May 19, 1978

[30] Foreign Application Priority Data

May 23, 1977 [JP] Japan ............................ 52-66219[U]
Mar. 8, 1978 [JP] Japan .................................. 53-26186

[51] Int. Cl.³ ......................................... H02K 47/04
[52] U.S. Cl. .................................... 310/113; 310/154; 310/160; 310/181; 310/266; 310/268
[58] Field of Search .............. 310/155, 171, 112, 113, 310/114, 40 MM, 154, 160, 161, 181, 66, 67, 165, 266, 268, 89; 322/46, 47, 49, 51, 52; 363/157, 170; 335/229–235

[56] References Cited

U.S. PATENT DOCUMENTS

| 2,202,172 | 5/1940 | Stoller | 310/113 |
|---|---|---|---|
| 2,597,207 | 5/1952 | Underwood | 310/113 |
| 2,898,486 | 8/1959 | Sheldon | 310/171 |
| 3,197,660 | 7/1965 | Leischner | 310/160 |
| 3,445,701 | 5/1969 | Shapiro | 310/160 |
| 3,604,965 | 9/1971 | Stroud | 310/155 |
| 3,736,449 | 5/1973 | Honeywell | 310/266 |
| 3,931,535 | 1/1976 | Roesel | 310/113 |
| 4,019,104 | 4/1977 | Parker | 310/113 |

FOREIGN PATENT DOCUMENTS 6910 5/1963 Japan ........................................ 310/171

Primary Examiner—R. Skudy
Attorney, Agent, or Firm—Fitzpatrick, Cella, Harper & Seinto

[57] ABSTRACT

An improved frequency generator is disclosed. The frequency generator includes such a permanent magnet that is magnetized in the direction of the axis of a rotary shaft with which the rotor of the generator is rotated. Between the second magnetic pole side of the permanent magnet and the rotor, there is disposed a flanged cylindrical frame member comprising a flange part and a cylinder part. At the side of the second magnetic pole, the permanent magnet is connected with the flange part of the frame member. The cylinder part of the frame member is arranged so as to surround the circumferential surface of the rotor. The flanged cylindrical frame member disposed in this manner is magnetically conductive so that the area through which the magnetic flux flows between the second magnetic pole side of the permanent magnet and the rotor is effectively increased as compared with the conventional one.

39 Claims, 10 Drawing Figures

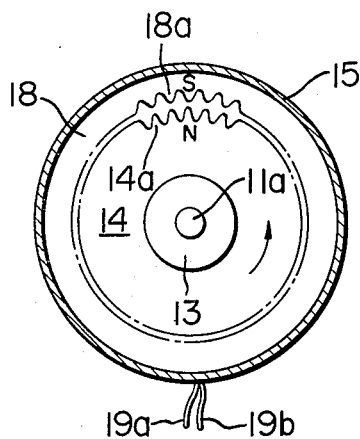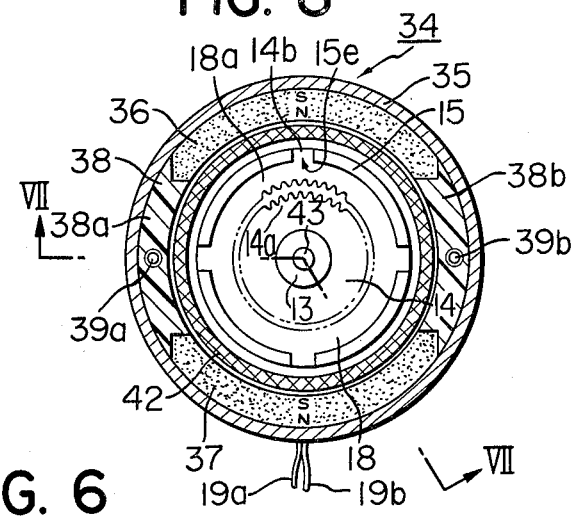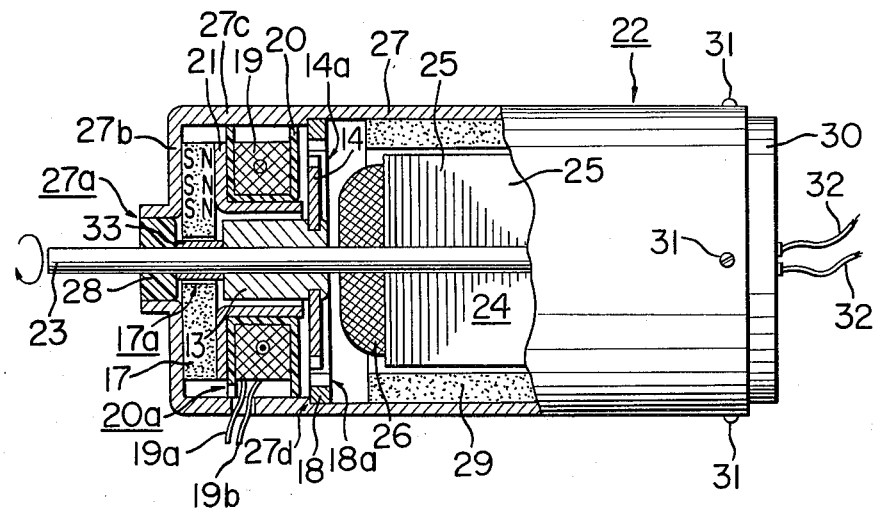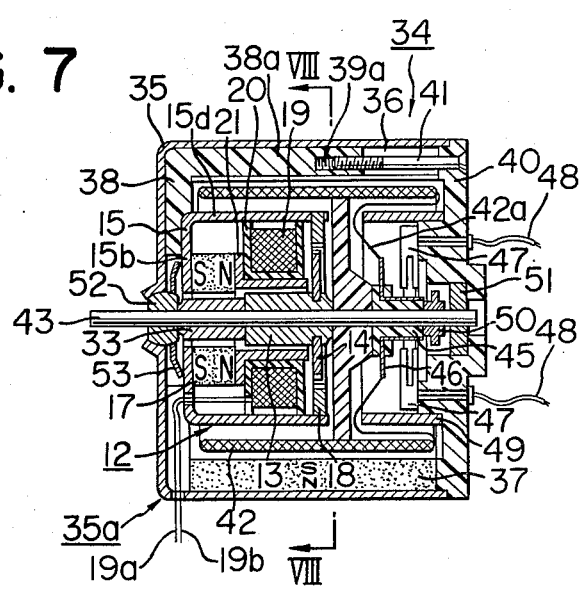

FREQUENCY GENERATOR AND MINIATURE MOTOR PROVIDED WITH THE SAME

BACKGROUND OF THE INVENTION

1. Field of the Invention

The present invention relates to a frequency generator of the type in which a pulse signal corresponding to the rotational speed of a motor is generated and also relates to a miniature motor provided with such frequency generator.

2. Description of the Prior Art

Frequency generators used for detecting the rotational speed of a motor and further for controlling the detected speed have been known in the art.

The principle structure of frequency generators is that a closed magnetic path including a permanent magnet is provided in such manner that the magnetic reluctance of the closed magnetic path may vary in proportion as the rotational speed of the rotary shaft and within the space enclosed by the closed magnetic path there is disposed a generation coil producing a pulse signal in response to a change of magnetic flux caused by the variation of the magnetic reluctance.

A typical example of such frequency generator pertinent to the present invention is disclosed in Japanese Patent Application Publication No. 6910/1963. The frequency generator disclosed in this publication includes a permanent magnet in a form of center bored disc. The disc like permanent magnet is so magnetized as to have one of the magnetic poles at the circumferential edge portion of the disc and another at the center portion of the disc. At the circumferential magnetic pole side, the permanent magnet disc is connected with a stationary frame made of magnetically conductive material. A magnetically conductive rotor rotatable with the rotary shaft is so disposed that the front end portion of the rotor is close to and opposed to the center magnetic pole side of the permanent magnet.

the frequency generator further comprises a first and a second group of projections. The first group of projections comprises a plural number of magnetically conductive projections and is rotatable with the rotor. The second group of projections comprises the same number of magnetically conductive projections as that of the first one and is fixedly supported by the stationary frame in such manner as to surround the first group of projections. For the above described type of permanent magnet, a closed magnetic path is formed by the rotor, the first and second groups of projections and the stationary frame. Within the inner space of the close magnetic path there is disposed a power generation coil. As the rotary shaft rotates, a change of magnetic reluctance occurs between the first group of projections and the second one in proportion as the rotation of the rotary shaft. Thus, a corresponding change of magnetic flux is caused by the change of the magnetic reluctance and thereby in the power generation coil there is produced a pulse signal in response to the change of magnetic flux.

The prior art frequency generator of the above described arrangement has the following disadvantage.

First of all, the permanent magnet used therein as a source of magnetomotive force is very difficult to manufacture and very expensive. The permanent magnet is in a shape of center bored disc and is magnetized radially along the direction of radius of the disc. Namely, the direction of magnetization is so selected that the magnet disc has one of the magnetic poles at the circumferential edge portion of the disc and another pole at the center portion thereof. Such a permanent magnet is very difficult to manufacture and also very expensive.

Secondly, the quantity of electric power generated in the generating coil is too small to obtain a good detection signal. Since the magnetomotive force of the permanent magnet is limited by the quantity of magnetic charge of the magnetic pole at the center portion of the disc, the magnetomotive force is very weak and therefore the quantity of magnetic flux flowing the magnetic path necessarily becomes small. As a result, the electric power generated in the generating coil at the time of of motor speed becomes too small to obtain a good detection signal. In this case, of course, it is possible to prevent such a reduction of the magnetomotive force to some extent by enlarging the thickness of the permanent magnet disc. However, this means the use of a larger size of permanent magnet, which is against the general requirement of miniaturization and compactness of frequency generator as a whole. If the size of frequency generator is unduely enlarged, then it will give arise a difficulty in mounting the generator on a common type of miniature motor.

Lastly, the prior art frequency generator has a limitation in its application. When the rotary shaft has any play of movement in the thrust direction, the distance of air gap between the front end of the rotor and the center magnetic pole side of the permanent magnet varies from time to time. Therefore, the amount of magnetic flux flowing through this area is also varied. As a result, there is caused a misleading change in the quantity of electric power generated in the generating coil. To avoid this trouble, means for preventing the thrust play of the rotary shaft must be provided additionally. Otherwise, the application of the frequency generator must be limited only to such type of motor the rotary shaft of which has no play of movement in the thrust direction.

SUMMARY OF THE INVENTION

Accordingly, it is a general object of the invention to provide an improved frequency generator which eliminates all the disadvantages involved in the prior art ones described above.

A more specific object of the invention is to provide an improved frequency generator which is simple and compact in structure and small in size and also inexpensive and which enables to greatly increase the amount of magnetic flux flowing in the closed magnetic path surrounding a generation coil and therefore increase the quantity of electric power obtainable from the generating coil.

Another object of the invention is to provide a frequency generator which is effectively applicable also to such a miniature motor the armature rotary shaft of which has some play of movement in the thrust direction.

A still more specific object of the invention is to provide a frequency generator in which the adverse effect of the variation in the amount of flow of magnetic flux caused by the above mentioned thrust play of the rotary shaft is minimized and therefore the adverse effect of shaft is minimized and therefore the adverse effect of the change in quantity of the electric power generated in the generating coil becomes negligibly small.

A further object of the invention is to provide a frequency generator which can be formed as a compact unit and therefore makes it very easy to mount the frequency generator on a common type miniature motor or to incorporate the frequency generator into a common type miniature motor.

To attain the above objects according to the invention there is provided a frequency generator of the type comprising a stationary magnetically conductive frame connected with a permanent magnet at the side of its first magnetic pole, a rotor rotatable with a rotary shaft and so disposed that the front end of the rotor is closely opposed to the side of the second magnetic pole of the permanent magnet, a first group of projections rotatable with the rotor and comprising a plural number of magnetically conductive projections, a second group of projections comprising the same number of magnetically conductive projections as that of the first one and being fixedly supported by the stationary frame in such manner as to surround the first group of projections and a power generation coil disposed within the inner space of a closed magnetic path for the permanent magnet as formed by the rotor, the first and second groups of projections and the stationary frame in which power generation coil there is produced a pulse signal in proportion to the speed of rotation of the rotary shaft and characterized in that the permanent magnet is magnetized in a direction along the axis of the rotary shaft and that between the side of the second magnetic pole of the permanent magnet and the rotor there is provided a magnetically conductive frame in a shape of flanged cylinder disposed in such manner that the flange portion of the frame is connected with the permanent magnet at the side of its second pole and the cylindrical portion surrounds the circumferential surface of the rotor.

According to the present invention, the permanent magnet used in the frequency generator may be such permanent magnet which is in a shape of disc and is magnetized in the direction across the thickness of the disc. Such a permanent magnet is easy to manufacture and inexpensive. Further, such a permanent magnet may be designed to have a larger magnetomotive force as compared with the above described prior art one.

The use of a flanged cylindrical frame member according to the invention brings forth a particular advantage. It is allowed to greatly increase the area between the side of the second pole of the permanent magnet and the rotor through which the magnetic flux flows. Therefore, by making a full use of this increased magnetic flux coming from the permanent magnet, the amount of flow of the magnetic flux flowing in the closed magnetic path surrounding the power generating coil is increased to a great extent. As a result, from the generating coil there is obtained a sufficient large electric power enough to produce a strong output clearly informing of the rotational speed of the motor.

The use of a flanged cylindrical frame member as described above has another remarkable advantage in particular when the frequency generator according to the invention is used in association with a motor the rotary shaft of which has some play of movement in the thrust direction. Even when the rotary shaft on which the rotor is mounted has any thrust play, the possible variation in amount of the magnetic flux flowing between the rotor and the second pole side of the permanent magnet is minimized by the provision of the frame member according to the invention. Therefore, the degree of the adverse effect of the change in quantity of the electric power generated from the generating coil becomes negligibly low. This makes it possible to effectively apply the frequency generator also to such a motor the rotary shaft of which has a thrust play, without providing any additional and expensive means for preventing the thrust play.

Moreover, the above described arrangement allows for the frequency generator to be formed as a unit of high compactness and also to be mounted on or incorporated into a common type of miniature motor in a very easy and inexpensive manner.

Still a further object of the invention is to provide a coreless motor with a built-in frequency generator which is small in size and compact in structure as a whole and in which coreless motor and a frequency generator as described above are united together in a very advantageous form without any reduction of the output torque.

According to a preferred embodiment of the invention, this object is attained by fixedly disposing the frequency generator within the inner space of a coreless hollow cylindrical coil. To the rotary shaft of the coreless coil there is connected a rotor of the generator. With this arrangement, the whole body of the motor becomes small in size and compact in structure though the motor is provided with a built-in frequency generator. In particular, by employing the arrangement there is obtained such an advantage that the magnetically conductive casing frame of the generator disposed within the inner space of the coreless coil can be used also to form at least a portion of the magnetic path for field magnets disposed outside of the coreless coil.

Other and further objects, features and advantages of the invention will appear more fully from the following description.

BRIEF DESCRIPTION OF THE DRAWINGS

FIG. 5 is a cross-section taken along the line V—V in FIG. 4;

FIG. 6 shows a modification of the embodiment shown in FIG. 4 wherein the frequency generator is so modified as to form an integral part of a miniature motor;

FIG. 7 shows an embodiment of a coreless motor with a built-in frequency generator according to the invention;

FIG. 8 is a cross-section view taken along the line VIII—VIII in FIG. 7 (FIG. 7 is a longitudinal section view taken along the line VII—VII in FIG. 8);

DETAILED DESCRIPTION OF THE PREFERRED EMBODIMENTS

Figure 1:
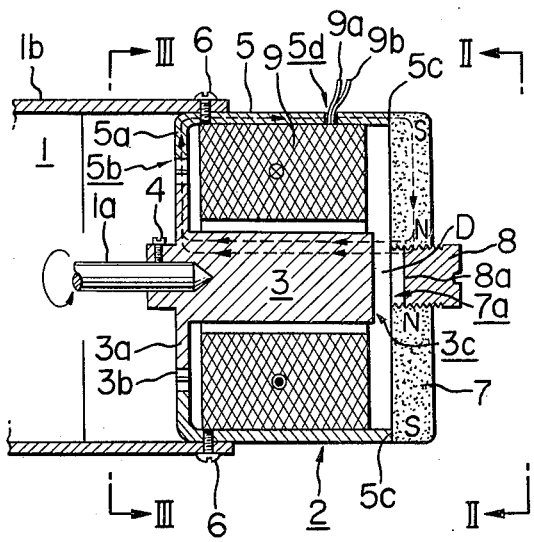
FIG. 1 is a sectional view of the essential part of a frequency generator according to the prior art.
Figure 2:
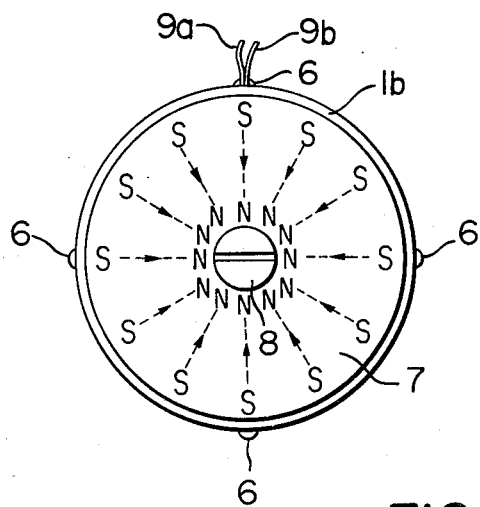
FIG. 2 is a view of the generator viewed along the line II—II in FIG. 1.
Figure 3:
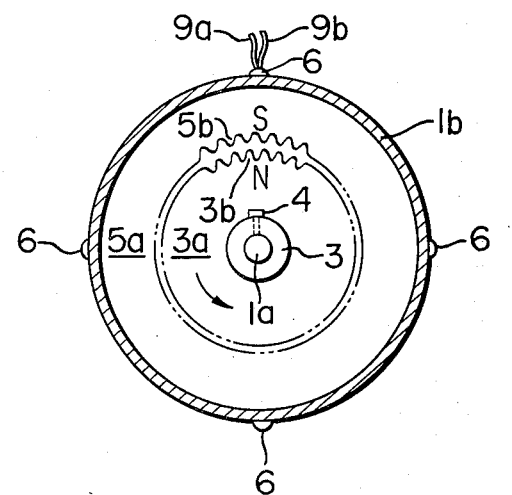
FIG. 3 is cross-sectional view thereof taken along the line III—III in FIG. 1.

Referring first to FIGS. 1 to 3 there is shown a frequency generator according to the prior art as disclosed in the aforementioned Japanese Patent Application Publication No. 6910/1963. In order to assist in a better understanding of the present invention, a detailed description of the structure of the prior art frequency generator will be made before beginning to describe the preferred embodiments of the present invention.

Designated by 1 is a miniature motor of which only a rotary shaft or armature 1a and a part of the motor housing or shell 1b are shown in the drawing. The reference numeral 2 designates a frequency generator mounted on the motor 1. Designated by 3 is a rotor of the generator made of magnetically conductive material such as soft iron. The rotor 3 is connected with the rotary shaft 1a at its one end and secured on the shaft by means of a screw 4. On the side of the connecting end, the rotor 3 has a disc 3a integrally formed therewith. As seen best in FIG. 3, on the circumference of the disc 3a there are formed a number (for example, n) of projections 3b distributed along the circumference at a constant pitch. These projections are hereinafter referred to as a first group of projections 3b. The reference numeral 5 designates a casing for the generator 2. The casing 5 is made of magnetically conductive material such as soft iron to allow a magnetic path to be formed therein. At the bottom part of the casing indicated by 5a there is formed a circular opening so as to receive the disc 3a of the rotor 3. As clearly seen from FIG. 3, on the inner circumference of the circular opening there are provided also a number of projections which are hereinafter referred to as a second group of projections 5b. The number and pitch of these projections in the second group 5b are equal to those of the first group of projections 3b. The casing 5 is secured to the open end of the motor housing 1b by means of screws 6. In this position, the second group of projections 5b and the first group of projections 3b are precisely opposed to each other as shown in FIG. 1.

Designated by 7 is a permanent magnet in a shape of center bored disc which may be, for example, a magnet of alnico system. The center bore 7a of the disc magnet 7 is threaded to receive a screw 8 the function of which will be described later. The magnet 7 is secured to the open end portion 5c of the casing 5 by means of bonding agent or other suitable fixing means in such manner that the threaded center bore 7a may be positioned opposed to the front end 3c of the rotor 3 with a small spacing therebetween. The disc magnet 7 is radially magnetized in the direction of radius, for example, in a manner as illustrated in FIG. 2 in which the disk of permanent magnet 7 has its N pole at the circumferential area of the center bore 7a and its S pole at the area along the outer circumference of the disc.

The screw screwed in the center bore 7a of the permanent magnet 7 is a set screw by which the degree of magnetic coupling between the N pole of the permanent magnet 7 and the rotor 3 is adjusted. The set screw is made of magnetically conductive material and is screwed in or out with a suitable tool such as a screw driver to change the air gap length D between the end 8a of the set screw 8 and the front end 3c of the rotor 3. By changing the air gap length D in this manner, the degree of magnetic coupling between the N pole of the magnet 7 and the rotor 3 can be adjusted as desired.

Designated by 9 is a coil for electric power generation the manner of winding of which is seen in FIG. 1. The above described rotor 3, first group of projections 3b, second group of projections 5b and casing 5 together constitute a closed magnetic path for the permanent magnet 7. Flow of magnetic flux in the magnetic path is suggested by the broken line with arrow in FIG. 1. The coil 9 is fixedly disposed within the space enclosed by the magnetic path in such manner as to surround the rotor 3. Both the ends 9a and 9b of the winding are led out from the casing 5 through an opening 5d provided on a portion of the side wall of the casing.

In the above described arrangement of a frequency generator there exists a flow of magnetic flux around the generation coil 9 flowing through N pole of the permanent magnet 7→screw 8→rotor 3→first group of projections 3b→second group of projections 5b→casing 5→S pole of the permanent magnet. In this state of the generator, if the motor 1 is started operating and thereby the rotary shaft 1a of the amature is driven into rotation in the direction indicated by an arrow in FIG. 1, then the rotor 3 will also rotate in the direction indicated by an arrow in FIG. 3. As the rotor 3 rotates, the first group of projections 3b provided on the disc part 3a of the rotor 3 is shifted relative to the second group of projections 5b provided on the bottom part of the casing 5. As a result, between the two groups of projections there occurs a change of magnetic reluctance at a cyclic interval corresponding to the rotation of the rotary shaft 1a. Therefore, the magnetic flux in the magnetic path surrounding the generating coil 9 varies cyclically and thereby an alternating current is generated in the generating coil in a cycle corresponding to the rotation of the rotary shaft 1a. The alternating current thus produced in the coil is put out through the terminals 9a, 9b of the winding.

The alternating current obtained in this manner may be used for indicating the rotational frequency of the motor 1 or for controlling the rotational speed of the motor 1. Thus, an indication of the rotational frequency of the motor 1 using an indicating instrument becomes possible when a frequency detector is connected with the terminals 9a, 9b so that the detector detects the frequency of the alternating current from the terminals and the detected output drives an indicating instrument such as a meter. Also, as disclosed in Japanese Patent Application Publication No. 6910/1963, a wave filter may be connected to the terminals 9a, 9b to control the rotational speed of the motor 1. The wave filter is adjusted to have its breaking point at the frequency of output of the frequency generator 2 produced when the motor 1 rotates at a reference rotational frequency predetermined therefor. To rectify the output of the wave filter, there is further provided a rectifier the output voltage of which is used to control the power supplied to the motor through a transistor circuit or the like. In this manner, it becomes possible to control the rotational frequency of the motor 1 so as to keep it constant at the level of the predetermined reference rotational frequency.

As already mentioned previously, the above described structure of frequency generator according to the prior art has the following disadvantages:

First of all, the permanent magnet 7 used as a source of magnetomotive force in the frequency generator of the above described prior art is very difficult to manufacture and also very expensive. The permanent magnet is in a form of a disc having an opening bored at its central portion. The direction of magnetization extends radially in the direction of the radius of the disc so that the disc magnet has its S pole, for example, at the outer circumferential area and its N pole around the center bore 7a. As will be easily understood, such a permanent magnet is very difficult to manufacture and becomes very expensive.

Secondly, the use of such permanent magnet as the magnet 7 does not allow to obtain a good detection signal, because of a small quantity of electric power generated in the coil 9. The magnetomotive force of the permanent magnet 7 is limited by the magnetization of N pole at the central area of the disc so that the magnetomotive force and therefore the quantity of magnetic flux flowing through the magnetic path becomes small. As a result, the electric power produced in the generating coil 9 at the time of detection of the rotational speed of the motor 1 is too small to obtain a good detection signal. Of course, the magnetomotive force of the permanent magnet 7 may be increased to some extent by enlarging the thickness of the magnet. But, by doing so the size of the permanent magnet itself becomes large, which is against the miniaturization and compactness of frequency generator as a whole. Also, such a large size of frequency generator will give rise to a problem in mounting it to a common miniature motor.

Lastly, the above described arrangement of frequency generator according to the prior art has a difficulty in setting the air gap D between the front end 3c of the rotor 3 and the corresponding end 8a of the set screw 8. The set screw 8 is screwed in the threaded center bore 7a of the disc like permanent magnet 7 as described above. If the rotary shaft 1a has any play of movement in the thrust direction, there will occur a change of the air gap distance D which in turn causes the electric power in the generating coil 9 to vary from time to time. Therefore, it is required to additionally provide means for preventing the thrust play of the rotary shaft 1a. Otherwise, the use of the frequency generator must be limited only to such type of motor the rotary shaft of which has no play of movement in the thrust direction.

The present invention eliminates all of the above described disadvantages involved in the prior art frequency generator.

Now, the preferred embodiments of the present invention will be described in detail to illustrate the features and advantages of the invention.

Figure 4:
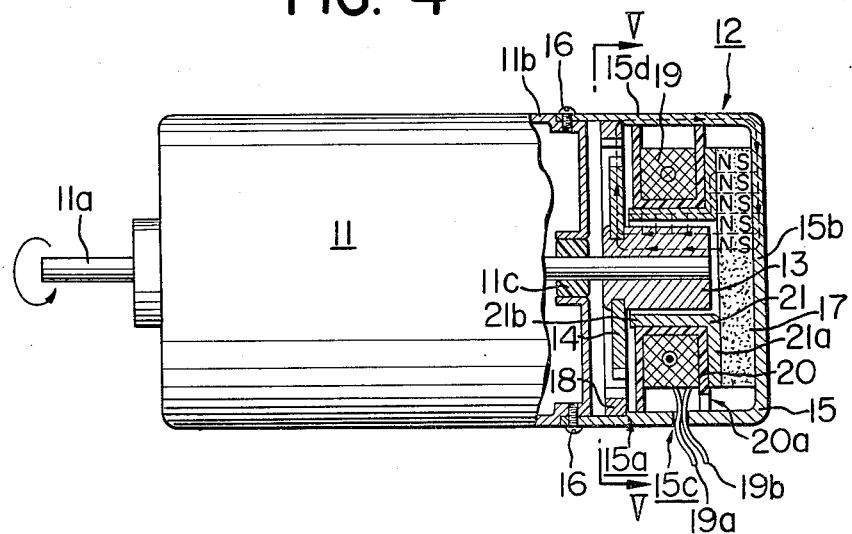
FIG. 4 shows an embodiment of the frequency generator according to the invention wherein the generator is mounted on a miniature motor.

Referring to FIG. 4 there is shown an embodiment of frequency generator according to the invention. In FIG. 4, the frequency generator 12 according to the invention is shown in the position where it is mounted on a miniature motor 11. The reference numeral 11a designates a rotary shaft of the armature of the motor, 11b is a motor housing and 11c is a bearing means mounted in the center bore of the motor housing 11b. The shaft 11a is rotatably supported by the bearing 11c. Designated by 13 is a rotor of the generator 12 having a predetermined thickness. The rotor 13 is made of magnetically conductive material such as soft iron and is fixedly fitted on the front end of the rotary shaft 11a as seen in FIG. 4. The reference numeral 14 designates a bored disc which is also made of magnetically conductive material such as soft iron material. As seen best in FIG. 5, on the outer circumferential edge of the disc 14 there is formed a first group of projections 14a comprising a plural number (for example, n) of projections distributed along the circumference at a constant pitch.

The disc is fixedly fitted on the base portion of the rotor so that the disc rotates together with the rotor 3 as shown in FIG. 4. 15 is a casing of the generator 12. The casing is also made of magnetically conductive material such as soft iron material so as to enable to form a magnetic path therein. As clearly seen from FIG. 4, the casing 15 is in a shape of cup and is secured on the motor housing 11b by means of screws 16 at its open end side. The reference numeral 18 designates a ring plate having a circular opening to receive the disc 14. The ring plate is made of magnetically conductive material such as soft iron material and the thickness of the ring plate 18 is larger than that of the disc 14. The ring plate 18 is fittingly engaged with a stepped portion 15a on the inner surface of the casing 15 and is so positioned that the inner circumferential surface of the ring plate may be properly opposed to the first group of projections 14a formed on the outer circumference of the disc 14. In this position, the ring plate 18 is fixed to the casing 15 at the stepped portion 15a. As illustrated in FIG. 5, on the inner circumferential edge of the ring plate 18 there is formed a second group of projections 18a. The number and pitch of the projections in the second group 18a are equal to those of the projections in the first group 14a.

Designated by 17 is a permanent magnet in a shape of disc which is so magnetized in the direction across the thickness of the disc that one side surface of the disc becomes N pole and the other side surface becomes S pole. In the shown embodiment, the disc like permanent magnet 17 is secured on the bottom part 15b of the cup like casing 15 by means of bonding agent or other suitable centering means at the S pole side surface of the magnet. As suitable materials for making the permanent magnet 17, mention may be made of anisotropic Ba-Fe (Barium Ferrite) and Sr-Fe (Strontium Ferrite) magnets.

Designated by 21 is a flanged cylindrical frame member made of magnetically conductive material such as soft iron material. The frame member 21 comprises a flange portion 21a and a cylinder portion 21b. The cylinder portion 21a surrounds the outer circumference of the rotor 3 and with the flange portion 21a the frame member is fixed to the N pole side surface of the permanent magnet 17 using a bonding agent or the like. 19 is a generating coil wound around a coil frame 20 made of magnetically non-conductive material such as plastic. The winding manner of the coil is seen in FIG. 4. The coil 19 is fixed to the outer surface of the frame member 21 together with the coil frame 20 by means of bonding agent or the like. The winding terminals 19a and 19b are led out from the casing 15 through an opening 15c bored in a portion of the circumferential wall of the casing. On the flange portion of the coil frame 20 there is provided a notch 20a which is used to lead out the winding terminals 19a and 19b at the time of assembly of the generator 12.

Assembling of the above described motor provided with a frequency generator may be carried out in the following manner:

Initially, the coil frame 20 having the coil 19 wound up thereon is bonded and fixed onto the surface of the frame member 21. At the same time, the permanent magnet 17 is aligned with the flange portion 21 of the frame member 21 and bonded fixedly thereto with its N pole side surface of the magnet. After leading the winding terminals 19a, 19b of the coil 19 to the exterior of the casing 15 through the notch 20a of the coil frame 20 and then through the opening 15c of the casing, the frame member 21, coil frame 20 with coil 19 and permanent magnet 17 already united together are inserted into the casing 15. While aligning the center of the cylinder part 21b of the frame member correctly with the center of the casing 15, the magnet 17 is fixed to the bottom part 15b of the casing by means of a bonding agent or the like on the S pole side surface of the disc of the permanent magnet. Thereafter, the ring plate 18 is precisely positioned by making use of the stepped portion 15a provided on the inner circumferential surface of the casing 15 and in this position the ring plate 18 is unmovably fitted to the casing. On the other hand, the disc 14 is firmly fitted on the base portion of the rotor 13. The rotor 13 with the disc 14 fitted thereto is fixedly mounted on the rotary shaft 11a of the motor 11. At this stage of assembly, the position of the disc is adjusted to the position in which the first group of projections 14a on the disc is disposed just opposed to the second group of projections 18a on the ring plate 18 and also the rotor is correctly received into the cylinder part 21b of the frame member 21. Keeping this position, the open end of the casing 15 is fitted to the corresponding end of the motor housing 11b and the casing is firmly fastened to the motor housing by means of screws 16. In this manner, an assembly of a motor and a frequency generator as shown in FIG. 4 is completely formed.

In the above described arrangement of frequency generator, there flows a magnetic flux around the generating coil 19 along the path of N pole of permanent magnet 17→flange portion 21a of frame member 21 (and rotor 13)→cylinder portion 21b of frame member 21→rotor 13→disc 14→first group of projections 14a→second group of projection 18a→ring plate 18→cylindrical portion 15d of casing 15→bottom portion 15b of casing 15→S pole of permanent magnet 17.

For the frequency generator in this position, when the motor 11 is started operating and the rotary shaft 11a is rotated in the direction indicated by the arrow in FIG. 4, the rotor 13 and the disc 14 are driven into rotation in the direction indicated by the arrow in FIG. 5. Thereby, in the same manner as in the case of the frequency generator of the prior art as shown in FIGS. 1-3 and previously described, there occurs a change of magnetic reluctance between the first and second groups of projections 14a and 18a in a cycle corresponding to the rotation of the rotary shaft 11a. As a result, in the generating coil 19 there is excited an alternating current in a cycle corresponding to the rotation of the rotary shaft 11a.

Compared with the previously described arrangement of the prior art frequency generator, the arrangement of frequency generator according to the present invention shown in FIG. 4 has the following advantages:

In the first place, the permanent magnet used in the invention is easy to manufacture and inexpensive. In the generator according to the invention, as the permanent magnet 17 there can be used such a disc like permanent magnet that is magnetized in the direction across the thickness of the disc so that it has N pole at the one surface side and S pole at another surface side of the disc. Such permanent magnet is very easy to manufacture. The manufacture can be made at a low cost using a suitable material such as anisotropic Ba-Fe or Sr-Fe magnet. Furthermore, it is allowed to contain a larger quantity of magnetic charge (magnetization) in the disc and therefore a larger magnetomotive force can be obtained.

In the second place, the use of the flanged cylindrical frame member 21 enables to enlarge the area where the magnetic flux flows between the N pole side of the permanent magnet 17 and the rotor 13 to a great extent. Therefore, by making a full use of the magnetic flux from the permanent magnet 17 without any loss, a considerable increase of the flow of magnetic flux in a closed magnetic path surrounding the generating coil 19 can be attained which in turn makes it possible to increase the amount of power produced in the coil 19 sufficiently enough to obtain a strong output clearly indicating the rotational speed of the motor 11.

Lastly, in connection with the above second advantage, the frequency generator of the present invention is effectively applicable to such a motor the rotary shaft of which has some play of movement in the thrust direction. Namely, even when the rotary shaft 11a on which the rotor 13 is mounted has any thrust play, the possible variation in the quantity of magnetic flux flowing between the N pole side of the magnet 17 and the rotor 13 is minimized owing to the provision of the flanged cylindrical frame member 21. Therefore, the adverse effect of variation in the power excited in the generating coil 19 caused by such thrust play of the rotary shaft becomes negligibly small. For this reason, the frequency generator of the invention is useful also for such a motor the rotary shaft of which has a thrust play, without providing any additional and expensive means for preventing the thrust play as required in case of the prior art one mentioned above. It is recommendable that the ring plate 18 should have a thickness larger than that of the disc 14 as illustrated in FIG. 4 so that even when the rotary shaft 11a has any thrust play, the outer circumferential surface of the disc 14 never moves going beyond the area of the inner circumferential surface of the ring plate 18. Of course, for the same purpose, the thickness of the disc 14 may be made larger than that of the ring plate 18.

FIG. 6 shows a modification of the embodiment shown in FIG. 4 and 5. In the modification of FIG. 6, a frequency generator as shown in FIGS. 4 and 5 is directly built in a motor in such manner that a portion of the motor housing may serve also as a casing of the generator which has to constitute a part of the above described closed magnetic path. In FIG. 6, those elements and members as used in the embodiment shown in FIGS. 4 and 5 are designated by the same reference numerals and characters.

Generally designated by 22 is a miniature motor provided with a frequency generator built in it. 23 is a rotary armature shaft on which an armature 24 is mounted. The armature 23 comprises a core 25 formed by a stack of laminated plates made of soft iron and a coil 26 wound up into a rectangular shape along the rotary shaft 23. The reference numeral 27 designates a motor casing mode of magnetically conductive material such as soft iron. 28 is a bearing member mounted on the front open end part 27a of the motor casing 27. The bearing member 28 supports the armature shaft 23 rotatably. 29 is a field magnet for armature which is so fitted and fixed to the casing 27 as to enclose the armature 24. The rear open end of the casing 27 is closed with a cover 30 fastened to the casing by screws 31. Designated by 32 are power supply lead wires connected to a known brush not shown in the drawing but disposed inside of the cover 30 in a known manner. While not shown in the drawing of FIG. 6, the motor 22 includes a known commutator to which the winding terminal of the coil 26 is connected and other conventional elements arranged in a known manner.

In association with the above described motor 22, a frequency generator is disposed within the motor casing 27. The structure of the frequency generator is essentially the same as that previously described with reference to FIGS. 4 and 5 with the exception that the casing 15 of the generator is removed. As clearly seen in FIG. 6, the frequency generator is contained in a space defined by the bottom 27b of the motor casing 27 and the armature 24.

To allow the rotary shaft 23 to pass through, the permanent magnet 17 has a relief bore 17a at its center portion. The permanent magnet 17 is fixed to the bottom 27b of the casing 27 at its S pole side after centering. The rotor 13 is firmly fitted on the rotary shaft 23. On the rotary shaft 23 there is mounted also a collar 33 which determines the distance between the bearing member 28 and the rotor 13. The ring plate 18 is positioned by stepped portion 27d on the inner surface of the casing and firmly fitted into the inner circumference of the casing 27.

Except the above, the arrangement of the frequency generator shown in FIG. 6 is entirely the same as that of FIGS. 4 and 5.

The manner of assembly of the above described miniature motor with a built-in frequency generator is as follows:

Initially, the bearing member 28 is fitted into the front open end 27a of the casing 27. Also, in a manner as described previously in connection with the embodiment of FIGS. 4 and 5, the permanent magnet 17, the flanged cylindrical frame 21 and the generating coil 19 wound up on the coil frame 20 are bound together into a unit. The unit thus formed is inserted into the casing 27 and firmly bonded to the bottom 27b of the casing while correctly centering it to the bottom. Thereafter, the ring plate 18 is fitted in the inner circumference of the casing 27 while properly positioning the ring plate relative to the inner surface of the casing with the aid of the stepped portion 27a provided on the surface. Further, the field magnet 29 is press-fitted into the inner circumference of the casing 27. On the other hand, the armature 24, commutator and other necessary elements are firmly fitted on the rotary shaft 23 in their proper positions. Also, the rotor 13 and the collar 33 are correctly positioned on the rotary shaft and then secured on it. After all the necessary elements have been mounted firmly on the rotary shaft, the rotary shaft 23 is inserted into the casing 27 up to the position at which the collar 33 on the rotary shaft 33 abuts against the bearing member 28. In this position, the field magnet 29 surrounds the armature 24, the ring plate 18 surrounds the disc 14 and the cylinder part 21b of the frame member 21 surrounds the rotor 13 respectively. Now, all of the elements are in their proper positions. Finally, the cover 30 is applied to the rear open end of the casing 27 to close it and the cover is secured in the position by means of screws 31.

In the frequency generator part built in the motor 22 shown in FIG. 6, there flows around the generating coil 19 a magnetic flux along the path of N pole of the permanent magnet 17—flange portion 12a of the frame member 21—cylinder part 21b of the same—the rotor 13—the disc 14—the first group of projections 14a—the second group of projections 18a—the ring plate 18—cylindrical part 27c of the motor casing 27—the bottom part 27b of the same—S pole of the permanent magnet 17. According to the modification described above, additional merits can be obtained. Since a portion of the motor casing serves also as the generator casing, the casing 15 of the generator shown in FIGS. 4 and 5 is no longer necessary. Furthermore, the size of the whole motor measured in the axial direction can be reduced remarkedly. Therefore, a much more compact structure is obtained.

The manner of power generation during the rotation of the rotary shaft 23 is entirely the same as that in the embodiment shown in FIGS. 4 and 5 and therefore explanation thereof is herein omitted.

Figure 9:
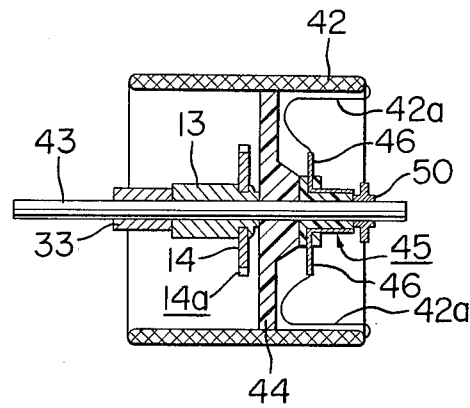
FIG. 9 is a partial sectional view of the coreless motor shown in FIG. 7, illustrating in detail the armature part of the motor.

FIGS. 7-9 show a preferred example of coreless motor in which a frequency generator as described above is used as a built-in generator. Elements and members identical with those in FIGS. 4-6 are designated by the same reference numerals and characters.

The reference numeral 34 generally designates a coreless motor with a built-in frequency generator 12 the arrangement of which is the same as the above. 35 is a casing in a form of cup which constitutes a motor housing. The cup like casing 35 is made of soft iron and has field magnets 36 and 37 fixed to the inner surface of the casing in a manner as illustrated in FIG. 8. The field magnets 36 and 37 for armature are supported by a supporting member 38 made of synthetic resin material which also supports the frequency generator 12 which is of the type described above with reference to FIGS. 4 and 5. To determine the spacing between the field magnets 36 and 37, the supporting member 38 has two protrusions 38a and 38b extending in the axial direction along the inner surface of the casing 35. On the end surfaces of the protrusions 38a and 38b there are formed threaded bores 39a and 39b respectively so as to receive screws 41 when a cover plate 40 is applied to the open end of the casing 35. Designated by 42 is a hollow cylindrical armature coil concentrically supported on a coil supporting disc 44 made of synthetic resin material with a portion of inner circumferential surface of the coil being bonded to the outer circumferential edge of the supporting disc. 45 is a commutator having a riser 46. The commutator 45 is secured on the rotary shaft 43 at the one side (right side as viewed in FIGS. 7 and 9) of the coil supporting disc 44. To the armature riser 46 there is soldered the winding terminal 42a of the coil 42. As seen best in FIGS. 7 and 9, the terminal 42a is led along and close to the inner wall surface of the coil 42 and the disc surface of the supporting disc 44. The power supply to the armature coil 42 is effected externally through a brush 47 mounted on the inner surface of the cover plate 40 in such manner as to contact with the commutator 45. Connected to the brush 47 is a power supply lead wire 48. A cylindrical yoke 49 is mounted on the inner surface of the cover 40 so as to form a magnetic path for the field magnets 36, 37 in the area where the yoke is close to the terminal segment of the coil led out on the right side of the coil supporting disc 44. Mounted on the rear end portion of the rotary shaft 43 is an oil thrower. 51 is a plain metal bearing fixed to the center portion of the cover plate 40 to support the rotary shaft at its rear end. 52 is a ball metal bearing retained by a leaf spring 53 at the front opening of the casing 35 to support the rotary shaft 43 at its front end.

In the above described arrangement, the frequency generator 12 is built in the motor making use of the space provided within the armature coil 42 in a manner as shown in FIGS. 7 and 8. More particularly, the bottom part 15b of the generator casing 15 is fixedly bonded to a portion of the supporting member 38 which is in turn fixed to the bottom of the motor casing 35. In order to allow the insertion of the collar 33 mounted on the rotary shaft 43, the casing 15 and the permanent magnet 17 have each a relief bore provided in the center portion. The above mentioned leaf spring 53 is disposed between the bottom 15b of the generator casing 15 and the bottom of the motor casing 35 and elastically retains the ball bearing 52 sandwiched in between the bottom of the motor casing 35 and the leaf spring itself.

The rotor 13 is mounted, together with the collar 33, on the rotary shaft 43 at the side (left side as viewed in FIGS. 7 and 9) opposite to the side at which the commutator 45 is mounted on the rotary shaft. The winding terminals 19a and 19b are led out to the outside of the motor casing 35 through the hole 35a bored in the casing.

As clearly shown in FIG. 8, the ring plate 18 has four lugs 18b distributed at an equal distance along the outer circumference of the ring. These lugs are designed to engage in split slots 15e correspondingly formed on the open end of the generator casing 15. By cauking, the ring plate with its lugs being engaged in the split slots of the casing is firmly fixed to the generator casing 15.

The manner of operation of the armature part in the above described arrangement of coreless motor is entirely the same as that of the conventional one and electric power is produced in the frequency generator 12 in the same manner as in the case of FIGS. 4 and 5 embodiment. Therefore, further detailed description thereof is herein omitted. However, note should be taken to the following point:

In the above described arrangement of coreless motor, the main magnetic flux coming from the field magnets 36, 37 for armature may flow into the casing 15 of the frequency generator 12 and other parts. But, in case of a coreless motor, this main magnetic flux is only a static magnetic field and it cannot be such magnetic field that changes alternately. It has been already confirmed that this flow of the main magnetic flux has no adverse effect on the function of the frequency generator 12.

The coreless motor with a built-in frequency generator shown in FIGS. 7–9 and described above has such advantage that the yoke 49 is required to be provided only on the right hand side of the supporting disc 44 as viewed in the drawing of FIG. 7 to form a magnetic path and that on the left side of the supporting disc 44 there is no need for such a yoke to be provided. As will be well understood from FIG. 7, in the left side of the coil supporting disc 44, a magnetic path for the field magnets 36, 37 can be formed by making use of the cylinder part 15d of the generator casing 15 without any need of yoke.

Figure 10:
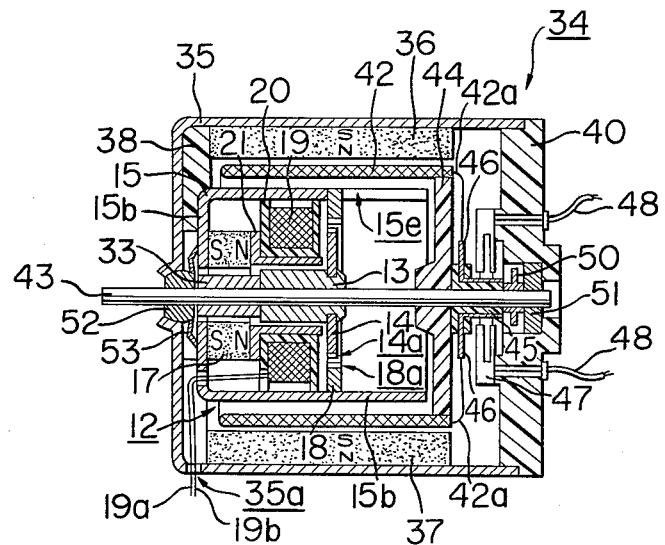
FIG. 10 shows another embodiment of the coreless motor with a built-in frequency generator according to the invention.

FIG. 10 shows a modification of the embodiment described above with reference to FIGS. 7–9. This modification is featured by the fact that no yoke is required to form a magnetic path. To this end, the cylindrical armature coil 42 is fixed to the coil supporting disc 44 in such a manner that no portion of the coil extends into the space area on the right hand side of the supporting disc 44. As seen in FIG. 10 this is achieved by applying the inner circumferential surface of the one end of the coil 42 onto the outer circumferential edge of the supporting disc 44 and binding the former to the latter by bonding. Since there exists no part of the coil 42 in the area on the right side of the supporting disc 44, the yoke 49 used in the arrangement shown in FIG. 7 for forming a magnetic path becomes no longer necessary. All the necessary magnetic paths for field magnets 36 and 37 can be formed making use of the cylinder part 15d of the generator casing 15 the length of which is now elongated sufficiently enough to cover the whole inner cylindrical surface of the coil 42 with its cylinder part 15d. Therefore, this modification enables to further reduce the number of the necessary parts and elements. Except the above described changes in structure, the arrangement of the coreless motore shown in FIG. 10 exactly corresponds to that shown in FIGS. 7–9.

Although the invention has been described in its preferred forms with a certain degree of particularity, it is to be understood that the present invention is not limited to the specific embodiments. For example, the number of projections 14a and 18a provided on the disc 14 and on the ring plate 18 respectively is not always necessary to be plural and equal to each other. In view of the principle of frequency generator, the disc 14 and the ring plate 18 may have only one projection each. In this case, an output in a form of pulse will be obtained from the generating coil 19 every rotation of the rotary shaft 11a; 23; 43. Even when plural numbers of projections are provided on each of the disc 14 and the ring plate 18, the number of projections on the former and that on the latter may be different each other. The ratio of the number of projections in one group to that in another group may be an integer ratio. But, it is essential to arrange these projections at a constant pitch interval for the first group of projections 14a and for the second group of projections 18a respectively.

Also, while it has been described relating to the coreless motor shown in FIGS. 7–10 that the armature coil 42 and the coil supporting disc 44 are connected together to form a unitary part by binding a portion of the inner cylindrical surface of the coil 42 onto the outer circumferential edge of the supporting disc 44 made of synthetic resin material by bonding, the coil 42 and the supporting disc 44 may be formed together by molding in a well-known manner.

What I claim:
1. A frequency generator comprising:
(a) a magnetically conductive casing in a shape of cup having a cylinder part and a bottom part;
(b) a permanent magnet having a first flat surface and a second flat surface magnetized in such manner that the first magnetic pole of the permanent magnet is at the side of the first flat surface and the second magnetic pole is at the side of the second flat surface and disposed within the inner space of said casing with its first flat surface being connected with the bottom part of said casing;
(c) a magnetically conductive frame having a flange part and a cylinder part with its flange part being connected with the second flat surface of said permanent magnet;
(d) a power generation coil disposed in the space existing between the cylinder part of said casing and the cylinder part of said frame;
(e) a magnetically conductive rotor at least a portion of which is received rotatably within the cylinder part of said frame;
(f) a first group of magnetically conductive projections supported on a portion of said rotor outside of the cylinder part of said frame so as to be rotatable with said rotor; and (g) a second group of magnetically conductive projections supported on a portion of the cylinder part of said casing so as to face the rotation path of said first group of projections.

2. A frequency generator as claimed in claim 1, wherein the plural number of projections in said first group of projections are distributed around one same circumference at an equal pitch distance.

3. A frequency generator as claimed in claim 1, wherein the plural number of projections in said second group of projections are distributed around one same circumference at an equal pitch distance.

4. A frequency generator as claimed in claim 3, wherein said second group of projections includes an equal number of projections to the number of projections in said first group of projections.

5. A frequency generator as claimed in claim 4, wherein the size of thickness of each the projection contained in said first group of projections measured in the direction along the rotational axis of the rotor is difference from that of said second group of projections.

6. A frequency generator as claimed in claim 3, wherein said first group contains n in number of projections whereas said second group contains N in number of projections and the ratio of N to n is in an integer ratio.

7. A frequency generator as claimed in claim 6, wherein the size of thickness of each the projection in said first projection group measured in the direction along the rotational axis of the rotor is different from that of said second projection group.

8. A frequency generator as claimed in claim 1, wherein said frequency generator further comprises:
a rotary shaft for driving said rotor into rotation and
a bearing member mounted on a portion of the bottom part of said casing for rotatably supporting said rotary shaft, and wherein said permanent magnet has an opening bored through it as to allow said rotary shaft to pass through the opening, said bearing member rotatably supports said rotary shaft passing through the interior of the cylinder part of said frame and said opening of the permanent magnet, at the front end of said rotary shaft, and said rotor is mounted on a portion of said rotary shaft in such manner that at least a portion of said rotor is located within the cylinder part of said frame and is rotatable with said rotary shaft.

9. A combination comprising:
(a) a coreless motor including a motor housing in the shape of a cup having a cylinder part and a bottom part, a rotary shaft which passes through the center of the cylinder part of said motor housing, a hollow cylindrical armature coil mounted on a portion of said rotary shaft for rotation with the shaft, the axis of which is aligned with the center axis of the cylinder of said coil, and permanent field means for said armature coil fixedly disposed along the inner circumferential surface of the cylinder part of said motor housing and surrounding the outer cylindrical surface of said armature coil; and
(b) a frequency generator including a magnetically conductive casing in the shape of a cup having a cylinder part the outer diameter of which is smaller than the inner diameter of the cylinder of said armature coil and a bottom part, said casing being disposed within the inner space of the cylinder of said armature coil in a position where at least a portion of the cylinder of said armature coil is retained in a sandwiched manner between the cylinder part of said casing and said permanent field means, and said casing being connected with the bottom part of said motor housing at the bottom part of said casing, a permanent magnet having a first flat surface and a second flat surface magnetized in such manner that the first magnetic pole of the permanent magnet is at the side of the first surface and the second magnetic pole is at the side of the second surface and disposed within the inner space of said casing with its first flat surface being connected with the bottom part of said casing, a magnetically conductive frame having a cylinder part and a flange part and connected with the second flat surface of said permanent magnet at its flange part, a power generation coil disposed in the space existing between the cylinder part of said casing and the cylinder part of said frame, a magnetically conductive rotor mounted on a portion of said rotary shaft within the cylinder of said armature coil for rotation with said rotary shaft, at least a portion of said rotor being rotatably received within the cylinder part of said frame, a first group of magnetically conductive projections supported on a portion of said rotor so as to be rotatable with said rotor, and a second group of magnetically conductive projections supported on a portion of the cylinder part of said casing so as to face the rotation path of said first group of projections.

10. A combination as claimed in claim 9, wherein said coreless motor further comprises a first bearing member mounted on the bottom part of said motor housing and adapted for rotatably supporting said rotary shaft and wherein in the bottom part of said casing and in said permanent magnet there is provided one opening each to allow said rotary shaft to pass through each the opening while said rotary shaft extends passing through the interior of the cylinder part of said frame, the opening of said permanent magnet and the opening of the bottom part of said casing and is supported by said first bearing member at the extended end of said shaft.

11. A combination as claimed in claim 10, wherein said coreless motor further comprises:
an end cover or bracket mounted on the open end of the cup of said motor housing and
a second bearing member mounted on said end cover for rotatably supporting said rotary shaft which is supported by said first bearing member at the other end of said shaft.

12. A combination as claimed in claim 11, wherein said coreless motor further comprises a supporting disc for mounting said armature coil on said rotary shaft, said supporting disc being mounted on a portion of said rotary shaft at its center part and connected with said armature coil at its outer circumferential edge.

13. A combination as claimed in claim 12, wherein said armature coil and said supporting disc are so connected together that the cross-section including the axis of said rotary shaft has a shape of H approximately and wherein said rotor and said casing are disposed within the cylinder of said armature coil but in a space area existing on one side of said supporting disc.

14. A combination as claimed in claim 13, said coreless motor further comprises a magnetically conductive yoke in a form of cylinder the outer diameter of which is smaller than the inner diameter of the cylinder of said armature coil, said yoke being mounted on said end cover in such manner that said yoke and said permanent field means retain at least a portion of the cylinder of said armature coil sandwiched in therebetween and existing on the other side of said supporting disc and said yoke being disposed within the cylinder of said armature coil but in a space area existing on the other side of said supporting disc.

15. A frequency generator comprising:
 (a) a magnetically conductive casing in a shape of cup having a cylinder part and a bottom part;
 (b) a permanent magnet having a first flat surface and a second flat surface magnetized in such manner that the first magnetic pole of the permanent magnet is at the side of the first surface and the second magnetic pole is at the side of the second surface and disposed within the inner space of said casing with its first flat surface being connected with the bottom part of said casing;
 (c) a magnetically conductive frame having a flange part and a cylinder part with its flange part being connected with the second surface of said permanent magnet;
 (d) a power generation coil disposed in the space existing between the cylinder part of said casing and the cylinder part of said frame;
 (e) a magnetically conductive rotor at least a portion of which is received rotatably within the cylinder part of said frame;
 (f) at least one magnetically conductive first projection supported on a portion of said rotor outside of the cylinder part of said frame as to be rotatable with said rotor; and
 (g) at least one magnetically conductive second projection supported on a portion of the cylinder part of said casing as to face the rotation path of said first projection.

16. A frequency generator comprising:
 (a) disc-shaped, permanent magnet means having first and second flat surfaces and magnetized in a direction such that a first magnetic pole is at said first flat surface and a second magnetic pole is at said second flat surface;
 (b) a first magnetically conductive structure having a flat surface and further having at least one magnetically conductive first projection positioned on a first circumference, the flat surface of said first magnetically conductive structure being connected with the first flat surface of said magnet means;
 (c) a second magnetically conductive structure having a flat surface and further having a cylindrical surface, the flat surface of said second magnetically conductive structure being connected with the second flat surface of said magnet means;
 (d) a third magnetically conductive structure having a cylindrical surface and further having at least one magnetically conductive second projection, means mounting the first, second and third magnetically conductive structure in a positional relationship such that the cylindrical surface of said third magnetically conductive structure faces the cylindrical surface of said second magnetically conductive structure and said second projection is disposed near said first circumference, and such that said first, second and third magnetically conductive structures define a magnetic flux path surrounding a space;
 (e) power generation coil means disposed in said space surrounded by said magnetic flux path; and
 (f) means for establishing a relative rotation between said first projection and said second projection.

17. A frequency generator as claimed in claim 16, wherein said first magnetically conductive structure has a plurality of magnetically conductive first projections positioned along said fiirst circumference and said third magnetically conductive structure has a plurality of magnetically conductive second projections each of which is disposed near said first circumference.

18. A frequency generator as claimed in claim 17, wherein each of said first projections are distributed along said first circumference at equal pitch distances.

19. A frequency generator as claimed in claim 18, wherein each of said second projections are distributed around a second circumference at an equal pitch distances.

20. A frequency generator as claimed in claim 19, wherein the ratio of the number N of the second projections to the number n of the first projections in an integer ratio.

21. A frequency generator as claimed in any one of claims 18 through 20, wherein said magnet means and said first and second magnetically conductive structures are positionally fixed relative to each other, said third magnetically conductive structure being rotatable and coupled with said means for establishing a relative rotation.

22. A frequency generator as claimed in claim 16, wherein said coil means is fixedly supported by at least one of said first and second magnetically conductive structures.

23. A frequency generator as claimed in any one of claims 16 through 22, wherein said first magnetically conductive structure comprises:
 a magnetically conductive, cup-shaped member which has a cylinder part and a bottom part having said flat surface;
 said magnet means being disposed within an inner space of said cup-shaped member with its first flat surface connected with the flat surface of the bottom part of the cup-shaped member; and
 a magnetically conductive annular member fixedly attached to a portion of the cylinder part of said cup-shaped member and having said one or more first projections on an inner circumferential surface thereof.

24. A frequency generator as claimed in claim 23, wherein said second magnetically conductive structure is a magnetically conductive flange member which includes a flange part having said flat surface and a cylinder part having said cylindrical surface and which is connected with the second flat surface of said magnet means at said flat surface of the flange part.

25. A frequency generator as claimed in claim 24, wherein said third magnetically conductive structure comprises:
 a magnetically conductive cylindrical member forming said cylindrical surface facing said cylindrical surface of the cylinder part of said flange member; and
 a magnetically conductive disc member fixedly attached to a portion of said cylindrical member and having said one or more second projections on an outer circumferential surface thereof.

26. A frequency generator as claimed in claim 25, wherein said coil means is disposed in a space formed by said cup-shaped member, said annular member, said flange member and said disc member.

27. A frequency generator as claimed in claim 26, wherein said coil means is fixedly supported by at least one of said cup-shaped member and said flange member.

28. A frequency generator as claimed in claim 27, wherein said cylindrical member is so arranged that at least a portion thereof is received within the cylinder part of said flange member so that the cylindrical surface of the cylindrical member faces the cylindrical surface of the cylinder part of the flange member.

29. A frequency generator as claimed in claim 25, wherein said magnet means, said cup-shaped member and said flange member are disposed fixedly, said cylindrical member being rotatable with said disc member and coupled with said means for establishing a relative rotation.

30. A frequency generator as claimed in claim 29, wherein said cup-shaped member constitutes at least a portion of an outer casing of the generator.

31. A frequency generator as claimed in claim 26, wherein said magnet means, said cup-shaped member and said flange member are disposed fixedly, said cylindrical member being rotatable with said disc member and coupled with said means for establishing a relative rotation.

32. A frequency generator as claimed in claim 31, wherein said cup-shaped member constitutes at least a portion of an outer casing of the generator.

33. A frequency generator as claimed in claim 27, wherein said magnet means, said cup-shaped member and said flange member are disposed fixedly, said cylindrical member being rotatable with said disc member and coupled with said means for establishing a relative rotation.

34. A frequency generator as claimed in claim 33, wherein said cup-shaped member constitutes at least a portion of an outer casing of the generator.

35. A frequency generator as claimed in claim 28, wherein said magnet means, said cup-shaped member and said flange member are disposed fixedly, said cylindrical member being rotatable with said disc member and coupled with said means for establishing a relative rotation.

36. A frequency generator as claimed in claim 35, wherein said cup-shaped member constitutes at least a portion of an outer casing of the generator.

37. A frequency generator comprising:
(a) disc-shaped, permanent magnet means having first and second flat surfaces and magnetized in a direction such that a first magnetic pole is at said first flat surface and a second magnetic pole is at said second flat surface;
(b) a first magnetically conductive structure forming a first portion of a magnetic flux path for said magnet means, said first means having at least one magnetically conductive first projection positioned in a first circumference, said first magnetically conductive structure being connected with the first pole of said permanent magnet means;
(c) a second magnetically conductive structure connected with the second pole of said magnet means and forming a further portion of said magnetic flux path for said magnet means, said second structure having a cylindrical surface;
(d) a third magnetically conductive structure forming a still further portion of said magnetic flux path for said magnet means, said third structure having a cylindrical surface and at least one magnetically conductive second projection, means mounting said first, second and third magnetically conductive structures in a positional relationship such that the cylindrical surface of said third structure faces the cylindrical surface of said second structure and said second projection is disposed near said first circumference and such that the magnetic flux path formed by said first, second and third magnetically conductive structures surrounds a space;
(e) power generation coil means disposed in said space surrounded by said magnetic flux path; and
(f) means for establishing a relative rotation between said first projection and said second projection.

38. A combination comprising:
(a) a motor housing;
(b) a bearing member mounted on a portion of said housing;
(c) an armature rotary shaft rotatably supported by said bearing member, a portion of which shaft extends outwardly beyond said motor housing; and
(d) a frequency generator including a magnetically conductive casing in the shape of a cup having a cylinder part and a bottom part and mounted on a portion of said motor housing at the open end of said cup in such manner as to receive in said cup the extended portion of said rotary shaft, a permanent magnet having a first flat surface and a second flat surface magnetized in such manner that the first magnetic pole of the permanent magnet is at the side of the first flat surface and the second magnetic pole is at the side of the second flat surface and disposed within the inner space of said casing with its first flat surface being connected with the bottom part of said casing, a magnetically conductive frame having a flange part and a cylinder part with its flange part being connected with the second flat surface of said permanent magnet, a power generation coil disposed in the space existing between the cylinder part of said casing and the cylinder part of said frame, a magnetically conductive rotor mounted on the extended portion of said rotary shaft rotatably with said shaft, at least a portion of said rotor being rotatably received within the cylinder part of said frame, said first group of magnetically conductive projections supported on a portion of said rotor outside of the cylinder part of said frame so as to be rotatable with said rotor, and a second group of magnetically conductive projections supported on a portion of the cylinder part of said casing so as to face the rotation path of said first group of projections.

39. A combination comprising:
(a) a magnetically conductive motor housing having a cylinder part and a bottom part;
(b) a bearing member mounted on a portion of the bottom part of said housing;
(c) an armature rotary shaft a portion of which is rotatably supported by said bearing member; and
(d) a frequency generator provided within said motor housing and including a permanent magnet having a first flat surface and a second flat surface magnetized in such manner that the first magnetic pole is at the side of the first flat surface and the second magnetic pole is at the side of the second flat surface, said permanent magnet having an opening bored through it as to allow said rotary shaft to pass through the opening and being received within said housing with its first flat surface being connected with the bottom part of said housing, a magnetically conductive frame having a flange part and a cylinder part and connected with the second flat surface of said permanent magnet at its flange part, above said rotary shaft which extends through the interior of the cylinder part of said frame and through the opening of said permanent magnet and which is supported by said bearing member in the vicinity of the front end of the shaft, a power generation coil disposed in the space existing between the cylinder part of said housing and the cylinder part of said frame, a magnetically conductive rotor mounted on a portion of said rotary shaft for rotation with said shaft, at least a portion of said rotor being rotatably received within the cylinder part of said frame, a first group of magnetically conductive projections supported on a portion of said rotor outside of the cylinder part of said frame so as to be rotatable with said rotor, and a second group of magnetically conductive projections supported on a portion of the cylinder part of said housing so as to face the rotation path of said first group of projections.

* * * * *

UNITED STATES PATENT AND TRADEMARK OFFICE
CERTIFICATE OF CORRECTION

PATENT NO. : 4,237,394
DATED : December 2, 1980
INVENTOR(S) : Kanemasa Aoki

It is certified that error appears in the above-identified patent and that said Letters Patent are hereby corrected as shown below:

Title page under [56] Attorney, Agent, or Firm, "Seinto" to read -- Scinto --;

Column 2, lines 65-66, delete "shaft is minimized and therefore the adverse effect of";

Column 8, line 33, "centering" to read -- cementing --.

Signed and Sealed this

Second Day of June 1981

[SEAL]

Attest:

RENE D. TEGTMEYER

Attesting Officer     Acting Commissioner of Patents and Trademarks